Jan. 15, 1957 T. A. WETZEL 2,777,201
PATTERN SUPPORT AND ADJUSTABLE TEMPLATE
Filed June 26, 1952 3 Sheets-Sheet 1

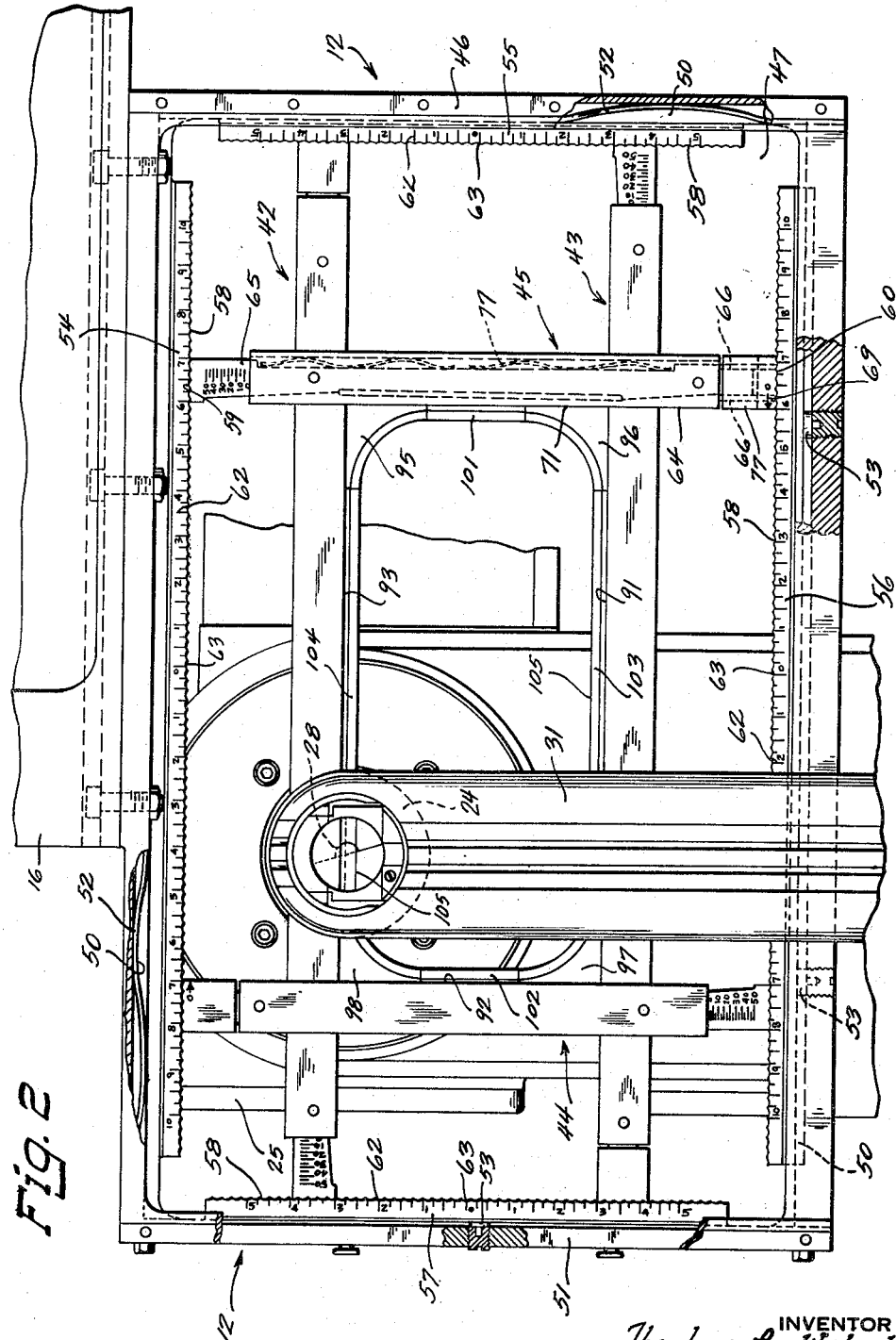

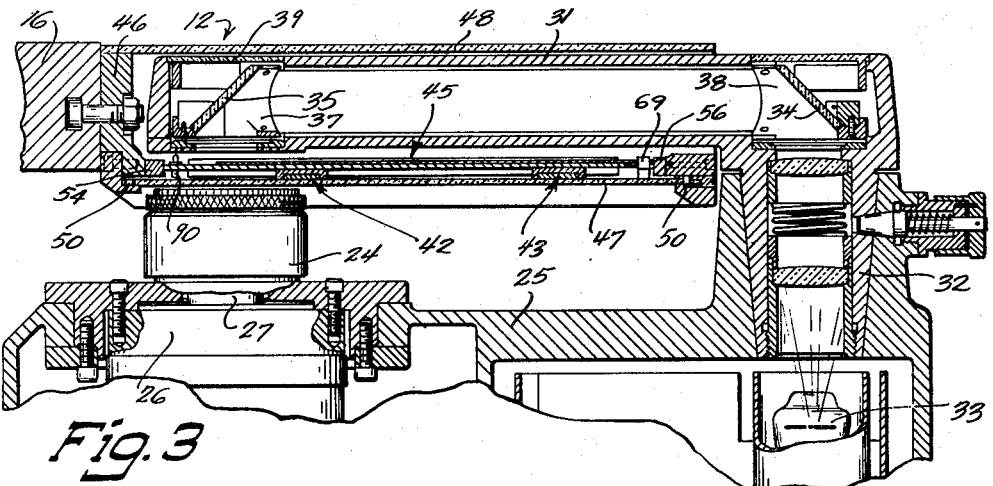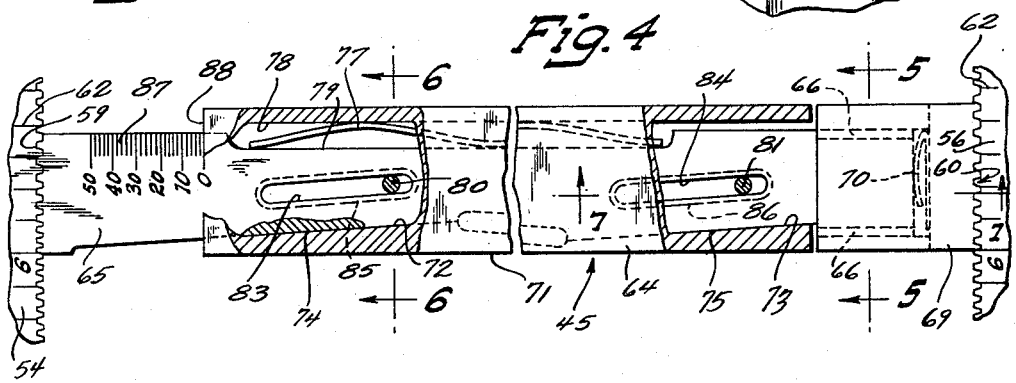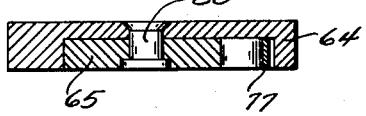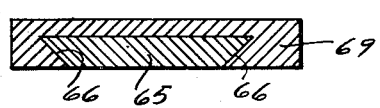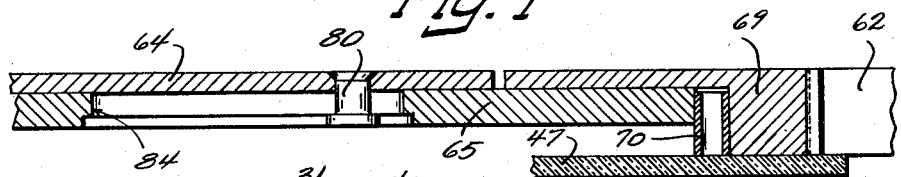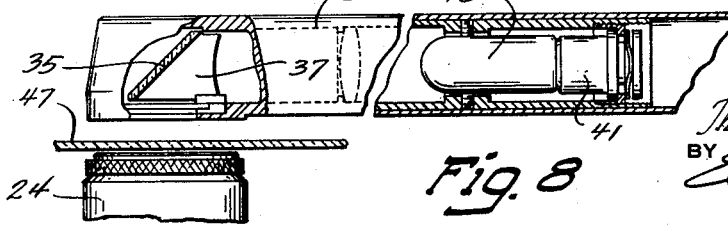

United States Patent Office 2,777,201
Patented Jan. 15, 1957

2,777,201

PATTERN SUPPORT AND ADJUSTABLE TEMPLATE

Theodore A. Wetzel, Milwaukee, Wis., assignor to Kearney & Trecker Corporation, West Allis, Wis., a corporation of Wisconsin Application June 26, 1952, Serial No. 295,785

11 Claims. (Cl. 33—23)

This invention is directed to tracer controlled machine tools, and more particularly to the combination of an improved pattern support and adjustable template for a light sensitive line tracker control system.

The present invention is adapted to be used in conjunction with line tracker control systems operative to control the feeding movements of a machine tool; such as the copy control system fully described in my co-pending patent application, Serial No. 246,980, filed September 17, 1951, and entitled Automatic Copying Machine With Anticipator Control. In machines of this general type, a guiding pattern or template is used to guide feeding movements of a work table relative to a cutter for automatically reproducing a contour corresponding in configuration to the guiding pattern. To effect this result, a beam of radiant energy is recurrently moved into overlapping and intercepted relationship with a relatively moving pattern contour to pass energy pulses that vary both in duration and periodicity according to the instantaneous angular direction of the contour. A photo electronic regulating system responsive to the energy pulses passed by the pattern is connected to activate a power source for causing relative translatory motion between the stream of radiant energy and the contour. Simultaneously, a like relative motion is effected between a cutting tool and a workpiece for reproducing a corresponding contour. A portion of each recurrent energy pulse passed by the guiding contour operates to effect a major relative motion between the contour and the beam of energy along the contour. Another portion of each recurrent energy pulse operates to effect a lateral correcting motion, when necessary, between the contour and the beam of radiant energy as the contour is relatively traversed.

As fully disclosed in the aforementioned patent application, a copying machine adapted to be controlled by a light sensitive line tracker control system is provided with a light source adapted to direct a beam of light toward a sensing device connected to activate the control system. A tool spindle carried in spaced relationship relative to the sensing device is operatively disposed above a work supporting table carried for movement in mutually perpendicular directions in accordance with the dictates of the control system. A transparent pattern support member secured to the work table is arranged to support a pattern delineating a guiding contour in operatively interposed relationship between the source of light and the sensing device. The pattern may be formed of any material having a differential effect on light or may be formed by scribing a line on an opaquely coated transparent plate. In any event, it is necessary to interpose a pattern between the light source and the sensing device to activate the control system and thus control feeding movements of the work table relative to the tool spindle for reproducing a corresponding contour. It is likewise necessary to properly position a workpiece on the work table in a position relative to the tool spindle that corresponds to the position of a pattern on the transparent pattern support relative to the sensing device. Heretofore, the proper positioning of a workpiece on the table in a position corresponding to the position of a guiding pattern on the pattern support has been a trial and error procedure that was particularly disadvantageous in the reproduction of only one or two workpieces. Likewise, special patterns or templates were required even in those jobs requiring relatively few workpieces. In addition to this, metal chips or other debris would often accidentally fall upon the edge of the pattern and interfere with the accurate reproduction of a contour.

A principal object of the present invention is to provide an improved pattern support for a line tracker controlled copying machine.

Another object of the present invention is to provide an improved pattern support in combination with a selectively adjustable template in a copying machine adapted to be controlled by a line tracker control system.

Another object of the present invention is to provide an improved pattern support incorporating means for protecting the area surrounding the guiding contour.

Another object is to provide an improved selectively adjustable guiding template for the line tracker control system of a copying machine.

Another object is to provide an improved positioning device for respectively locating a template and a workpiece in corresponding positions on the pattern support and work table of a line tracker controlled copying machine.

A further object is to provide an improved pattern support disposed to removably carry a transparent pattern support member and a transparent chip guard in spaced apart parallelism.

A still further object is to provide an improved selectively adjustable quadrilateral template constituted by a plurality of cooperating scales in combination with improved positioning means adapted to retain the scales in a selected position of adjustment.

According to this invention, a copying machine adapted to be controlled by a light sensitive line tracker control system is provided with an improved pattern support arranged to movably support a pattern in operatively interposed relationship between a light source and a sensing device associated with the control system. The pattern support is secured to a work supporting table carried for movement in mutually perpendicular directions and that is operatively disposed beneath a vertical tool spindle carried in fixedly spaced relationship to the sensing device. A power source connected to effect movement of the work table and pattern support in any angular direction of travel is arranged to be activated by a photoelectronic regulating system responsive to the sensing device. The pattern support comprises essentially a hollow frame member adapted to removably carry a transparent pattern support member and a transparent chip guard in spaced apart parallelism. A relatively stationary optical system extending inwardly between the movable chip guard and the transparent pattern support member is arranged to project a well collimated beam of light through the relatively movable transparent pattern support member and toward the sensing device. Whenever a pattern constituting a light differentiating line of trace partially intercepts the light beam from the optical system, the sensing device is operative to provide light pulses or signals for activating the photoelectronic regulating system. In response to the signal pulses, the power source is energized in a manner to effect simultaneous movement of the pattern support and work table along a directional path of travel corresponding to the line of trace delineated by the guiding pattern. To obviate the necessity of providing special patterns for different copying work, there is provided a system of adjustably positionable scales and filler blocks that are removably corried by the pattern support to constitute a selectively adjustable quadrilateral template of substantially symmetrical configuration. The scales are adapted to be retained by the pattern support in any selected position of precise adjustment for accurately positioning any irregularly configured pattern with respect to the sensing device. This arrangement facilitates the positioning of a workpiece upon the work table in the proper corresponding relationship to the cooperating tool spindle.

The foregoing and other objects of this invention, which will become more fully apparent from the following detailed specification, may be achieved by the particular apparatus that is depicted in, and described in connection with the accompanying drawings in which:

Fig. 2 is a plan view of the pattern support and the scales constituting an adjustable template and positioning device;

Fig. 3 is an enlarged fragmentary view in vertical section through the upper portion of the control box and the improved pattern support;

Fig. 4 is an enlarged plan view of one of the longitudinally, extensible scales with the parts partly broken away to show the lateral adjusting arrangement;

Fig. 5 is a view in transverse vertical section through one of the scales, taken along the line 5—5 in Fig. 4;

Fig. 6 is another view in transverse vertical section through one of the scales, taken along the line 6—6 in Fig. 4;

Fig. 7 is a view in longitudinal vertical section through one of the scales, taken along the line 7—7 in Fig. 4; and Fig. 8 is a fragmentary view in vertical section through a modified form of light source for the control system.

Figure 1:
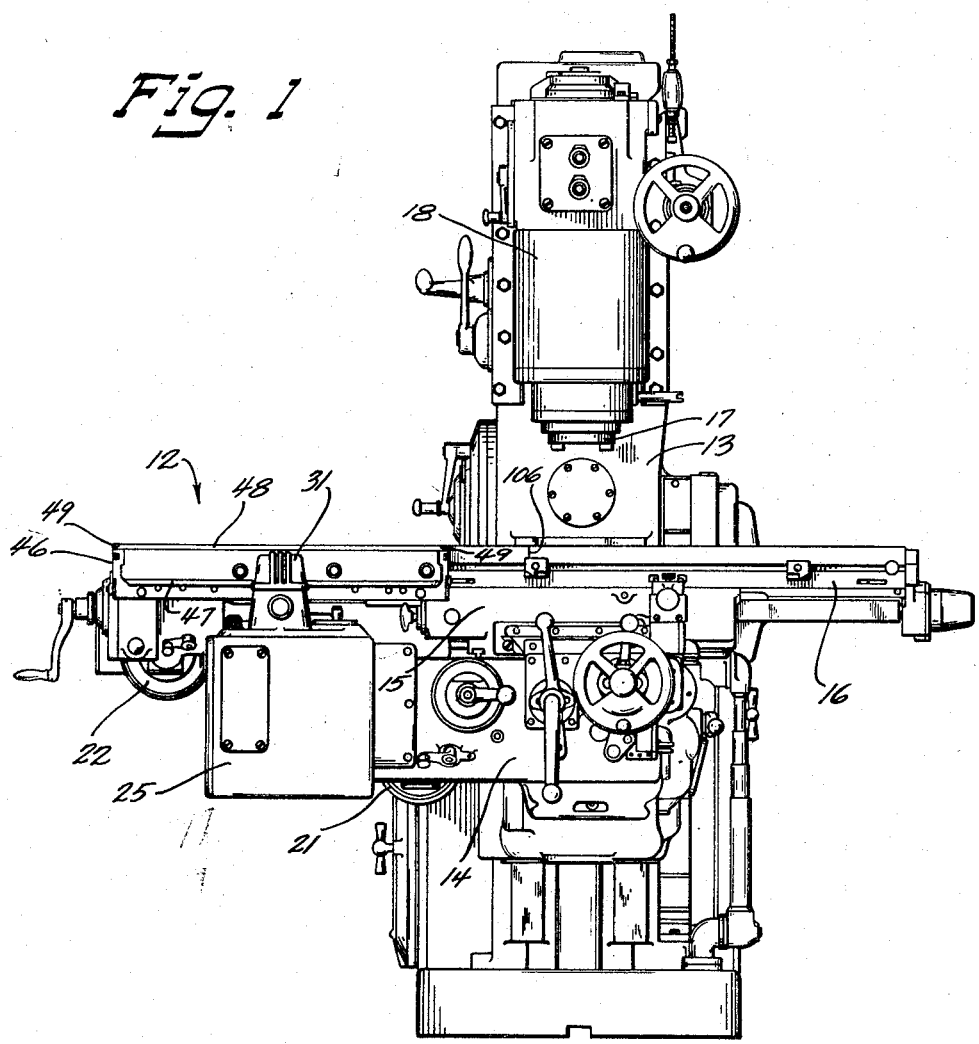
Figure 1 is a general view in front elevation of a copying machine that is illustrative of the type of machine tool in which the present invention is embodied to advantage.

Referring more specifically to the drawings and particularly to Fig. 1 thereof, the particular improved pattern support 12 is shown by way of illustration as an embodiment of this invention, is incorporated in a line tracker controlled vertical spindle milling machine of the knee and column type. The milling machine there shown is provided with the usual vertically upstanding column 13, that is disposed to slidably support on its front face a vertically adjustable knee 14. A saddle 15 is slidably carried on the upper face of the knee 14 for transverse adjustment toward or away from the front face of the column 13 is in turn arranged to slidably support on its upper surface a longitudinally movable work supporting table 16. A cooperatively disposed tool supporting spindle 17 is journalled to rotate in a vertically adjustable spindle head 18 that is slidably carried by the upper forward portion of the column 13.

Inasmuch as the saddle 15 and table 16 are movable in mutually perpendicular directions, it will be apparent that a coordinate movement of both of these members at the same feed rate will produce a resultant movement of the work table 16 along an angular directional path of travel relative to the tool spindle 17. The exact angular directional path of resultant movement of the work table 16 varies according to the variation in the relative feeding rates of the coordinately movable saddle 15 and work table 16 as well as their respective directions of movements.

To effect a coordinate feeding movement of the saddle 15 and table 16 at the required relative feeding rates, there are provided a pair of adjustable speed reversibly energizable copy feed motors 21 and 22 respectively carried at the left side of the knee 14 and the left end of the table 16. Each of the copy feed motors 21 and 22 is operatively connected by means of separate screw and nut actuating mechanisms (not shown) to transmit power for effecting feeding movement of the saddle 15 and work table 16 respectively. The copy feed motors 21 and 22 are proportionately energizable to effect a resultant feeding movement of the work table 16 relative to the tool spindle 17 along an angular directional path of travel corresponding to the directional changes in a guiding contour.

To this end, the copy feed motors 21 and 22 are connected to be continuously and proportionately energized in response to the dictates of a light sensitive line tracker control system such as the control fully disclosed in the aforementioned copending patent application.

To actuate the light sensitive control system (not shown) for energizing the copy feed motors 21 and 22, there is provided a rotating shutter head or sensing device 24, journalled to rotate in a control box 25 at the front leftward portion of the knee 14, as shown in Figs. 1 and 3. The shutter head 24 is rotated at synchronous speed by a motor 26 carried within the control box 25, the motor being provided with a hollow motor shaft 27 to permit passage of light signal pulses from an eccentrically formed light passing aperture 28 in the upper face of the shutter head 24 shown in Figs. 2 and 3. A well collimated beam of light is directed downwardly toward the shutter head 24 from the inner end of a hollow arm member 31 that is provided at its forward end with a bearing 32 fitted into a complementary bearing recess formed in the upper portion of the control box 25. From an incandescent light source 33 within the control box 25, light is directed upwardly through a bored hole extending through the bearing 32 toward a reflective mirror 34 carried within the forward end of the hollow arm member 31. From the mirror 34, the light is reflected horizontally through the arm member 31 toward a semi-transparent mirror 35 and thence downwardly toward the shutter head 24.

The semi-transparent mirror 35 is mounted in an adjustably positionable carrier 37 and the mirror 34 is mounted in a similar carrier 38. Each one of the carriers 37 and 38 is pivotally supported within the hollow arm 31 for angular adjustment in mutually perpendicular planes to facilitate the adjustment of the mirrors carried thereby for focusing a well collimated beam of light upon the shutter head 24. To assist the operator in properly adjusting the position of the light beam with respect to the shutter head 24, the inner or semitransparent mirror 35 is positioned directly below a transparent window 39 carried in an opening formed in the inner upper face of the arm 31. By means of this arrangement, a visual inspection of the reflected light beam relative to the shutter head can be made through the lens 39 and the semi-transparent mirror 34 positioned thereabove.

In a modified arrangement of the arm 31, as shown in Fig. 8, an incandescent light source 40 is supported in a carrier 41 adjustably mounted within the forward portion of the hollow arm 31 in a position to direct a relatively intense beam of light horizontally toward the semi-transparent mirror 35 and thence downwardly toward the shutter head 24.

To provide a sufficiently intense and well collimated beam of light for activating the photo-electronic control system, both of the light sources 33 and 40 are preferably of the type known as zirconium arc lamps. As is well known in the trade, this type of arc lamp is provided with a minute circular electrode adapted to produce an extremely intense spot of light. Although the zirconium arc lamp is especially suited as a source of a well collimated beam of intense light, it does possess an inherent disadvantage when used over a considerable period of time. With continued use, there is an extremely slight disintegration of the cathode and a resulting slight accumulation of small loose particles within the transparent bulb. To prevent these loose particles from interfering with a copying operation, the lamp 33, Fig. 3, is positioned vertically with the transparent bulb pointed up, while the lamp 40, Fig. 8, is positioned horizontally. Thus, any loose particles that may accumulate within the bulbs will drop toward the bottom or side of the bulbs respectively and not interfere with the transmission of light toward the shutter head.

According to the present invention, as shown in Figs. 2, and 3, the improved pattern support 12 is arranged to removably support a cooperating system of longitudinally extensible scales 42, 43, 44 and 45 constituting a predeterminately adjustable female template in operatively interposed relationship between the rotating shutter head 24 and a light beam directed downwardly from the inner end of the hollow arm member 31. The pattern support 12 comprises a hollow rectangular frame member 46 secured to the forward edge of the table 16 and adapted to carry a transparent pattern support member 47 and a transparent chip guard 48 in spaced apart parallelism. The frame member 46 together with the transparent support member 47 and chip guard 48 constitutes in effect a transparent envelope having its front side open for receiving the relatively stationary arm member 31 in operatively interposed relationship therebetween. The transparent chip guard 48 is adapted to protect the pattern supporting area and still permit a visual inspection of the shutter head 24 as well as a guiding pattern during a copying operation. This arrangement is particularly advantageous in copying machines employing a light sensitive line tracker control system because any metal chip or other debris that may come to rest on the edge of a pattern delineating a line of trace will cause an error in the work being reproduced.

The scales 42, 43, 44 and 45 are operative to position a pattern (not shown) of any type and any required configuration in a selected position on the transparent pattern support member 47 and relative to the shutter head 24. With the scales removed, the pattern support 12 may be utilized to support any other pattern (not shown) of a selected size and configuration. For retaining a pattern in a selected position upon the transparent support member 47, an adhesive such as a two-sided tape having an adhesive coating on both sides is placed between the underside of the pattern and the upper surface of the support member.

To provide access to the pattern supporting area, the chip guard 48 is removably carried in grooves 49 formed in the upper opposite edges of the frame member, as shown in Fig. 1. Thus, the chip guard 48 is removable from the supporting frame member 46 for removing or adjusting the position of a pattern carried by the transparent pattern support member 47. In like manner the transparent pattern support member 47 is removably carried within three grooves 50 formed in the lower opposite edges of the frame 46, as shown in Figs. 2 and 3. The transparent support member 47 may be removed from the frame 46 through a horizontal slot formed in the lower leftward edge thereof, and replaced by a transparent plate having an opaque contour formed thereon.

To retain the transparent pattern support member 47 within the three grooves 50 formed in the pattern support frame 46, a locking member 51 is removably secured to the leftward lower edge of the frame 46 by clamp screws, as shown in Fig. 2. Either the transparent support member 47, or a glass plate (not shown) of like size and carrying a scribed template, is carried within the grooves 50 for limited angular or lateral adjustment. To effect this result, a pair of leaf springs 52 are respectively carried within the rearward and rightward grooves 50 in a manner to resiliently engage the rearward and rightward edges of the pattern support member 47. One of the springs operates to urge the support member 47 leftwardly into engagement with a bearing member 53 movably carried in the removable locking member 51. The other or inner spring 52 operates to resiliently urge the transparent support member 47 forwardly into abutting engagement with a pair of bearing members 53 movably carried in the forward or outer edge of the frame 46. An adjusting screw associated with each of the bearing members 53, as shown in Fig. 2, is operative to selectively move one or another of the bearing members to effect the required adjusting movement of the transparent support member within the three grooves 50 formed in the lower edges of the frame 46.

For effecting a selective transverse adjustment of the longitudinally extensible scales 42, 43, 44 and 45, as shown in Fig. 2 the frame 46 is provided at its lower inner edges with a plurality of racks 54, 55, 56 and 57 having rack teeth 58 adapted to cooperate with complementary rack teeth 59 and 60 respectively provided at the extreme opposite ends of each of the scales. Each of the racks 54, 55, 56 and 57 is positioned in parallelism with and immediately above the grooves 50 and for receiving the transparent pattern support member 47, the latter being adapted to support the scales in any position of transverse engagement with the cooperating racks. The diametrically opposed racks 54 and 56 are in parallelism with each other and perpendicular to the opposed racks 55 and 57 which are likewise disposed in parallelism to each other. Thus, the scales 42 and 43 are engageable in a selected position of spaced apart parallelism between the opposed racks 55 and 57. In a similar manner, the scales 44 and 45 are engageable in a spaced apart parallelism between the opposed racks 54 and 56 in perpendicular relationship to the scales 42 and 43. By means of this arrangement, the four scales 42, 43, 44 and 45 are so positionable on the transparent pattern support member 47 and in engagement with the four racks 54, 55, 56 and 57 carried by the frame 46 as to cooperate therewith for providing a quadrilateral female template of predetermined adjusted size.

To determine the exact position of adjustment of the scales 42, 43, 44 and 45 with respect to the frame 46, the racks 54, 55, 56 and 57 are each provided with calibrations 62 ranging outwardly from a centrally located zero mark 63. The calibrations on each rack coincide with the pitch width of the individual rack teeth 58 as well as the calibrations on the diametrically opposed rack. Likewise, the zero marks 63 are so positioned that a point on the support member 47 determined by the intersection of two lines connecting the respective zero marks on each opposed pair of the racks marks the exact center of the transparent pattern support member 47. Whenever the axis of the shutter head 24 is coincidental with the center of the transparent pattern support member 47, the axis of the tool spindle 17 will likewise be positioned over the exact center point of the work supporting table 16.

In addition to being transversely adjustable in increments determined by the spacing of the calibrations 62, each of the longitudinally extensible scales 42, 43, 44 and 45 is laterally adjustable by an amount equivalent to one calibration, after being placed in a selected position of engagement between an opposed pair of the racks. Since all of the scales 42, 43, 44 and 47 are of identical construction only one of them will be described in detail. To provide for an infinite lateral adjustment, the scale 45 shown in Figs. 2 and 4, for example, comprises a longitudinally and laterally movable scale member 64 that is slidably carried by a longitudinally extensible scale support 65. At one end, the scale support 65 is provided with the integrally formed rack teeth 59, and at its opposite end with dovetailed way surfaces 66 disposed to engage a longitudinally slidable cap 69 that, in turn, carries the rack teeth 60. The cap 69 is resiliently biased by a spring 70 in a manner that the rack teeth 60 formed thereon are urged into engagement with the rack 56 in opposition to the rack teeth 59 at the opposite end of the scale support 65 being urged into engagement with the rack 54. By means of the calibrations 62 on the opposed racks 54 and 56 respectively, the longitudinally extensible scale support 65 is engageable therebetween in a manner that the front inner edge 71 of the laterally adjustable scale member 64 is perpendicular to the racks 54 and 56 as well as being in parallelism with the scale 44.

The parallel relationship of the scale member 64 is maintained irrespective of its longitudinally adjusted position along the scale support 65. To effect this result, the underside of the scale member 64 is provided with a longitudinally extending horizontal recess adapted to fully encompass the top surface and edges of the central portion of the scale support 65. The lower or inner side of the recess within the scale member 64 is formed in the shape of two identical angularly disposed way surfaces 72 and 73 arranged to slidably engage a pair of complementary way surfaces 74 and 75 respectively formed on the inner edge of the scale support 65. To retain the way surfaces 72 and 73 of the scale member 64 in slidable engagement with the complementary way surfaces of the support 65, a flat leaf spring 77 is interposed between the outer edge 78 of the recess within the scale member 64 and a recessed outer edge 79 of the scale support 65. A pair of pins 80 and 81 secured to the underside of the longitudinally movable scale member 64 extend through a pair of angularly disposed slots 83 and 84 respectively formed in the support member 65. The slots 83 and 84 are suitably enlarged on the underside of the scale support 65, as indicated by the dotted lines 85 and 86, to accommodate the enlarged lower ends of the pins 80 and 81 respectively.

It will be readily apparent that a longitudinal movement of the scale member 64 will effect a corresponding lateral movement of the inner edge 71 thereof with respect to the relatively stationary scale support 65. Further, assuming that the longitudinally extensible support 65 is positioned to engage the opposed racks 54 and 56 in perpendicular relationship, the inner edge 71 of the scale member 64 will be retained in perpendicular relationship to the racks in any selected position of longitudinal adjustment due to the disposition of the angular way surfaces 72 and 73 respectively. To measure the exact degree of lateral displacement of the inner scale edge 71, the scale member is longitudinally movable with respect to calibrations 87 formed toward one end of the cooperating scale support 65. With the end 88 of the scale member 64 coincidental with the zero mark on the scale support 65, as shown in Fig. 4, the inner edge 71 thereof coincides with the figure "6" of the rack calibrations 62, this being the selected position of the scale support 65. The scale member 64 is infinitely adjustable throughout a limited range of lateral movement as measured by the calibrations 87 on the support 65, this range of movement being equivalent to advancing the entire extensible scale support 65 one space as measured by the rack calibrations 62. To advance the scale support 65, the entire scale 45 is first lifted from engagement with the racks 54 and 56. The scale 45 is then replaced on the transparent pattern support member 47 with its opposite ends in the required selected position of resiliently biased engagement with the racks 54 and 56 as determined by the calibrations 62.

In setting up the scales within the pattern support 12 to constitute a female template of the required dimensions, the scales 42 and 43 are placed directly upon the transparent pattern support member 47 and in a selected position of engagement with the opposed racks 55 and 57. The intersecting scales 44 and 45, in turn, are then engaged between the racks 54 and 56 and are normally supported by the lower scales 42 and 43, as shown in Fig. 2. In the event both of the lower scales 42 and 43 are moved toward one edge of the pattern support 12, the upper scales might be tilted slightly from a horizontal plane and cause a distortion in the guiding contour. To obviate this difficulty, the upper scales 44 and 45 are provided toward one end with a downwardly projecting guide 90 that is adapted to engage the top surface of the transparent pattern support member 47 as shown in Fig. 3. At their opposite ends, the resiliently biased cap 69 of the scales 44 and 45 directly engages the upper surface of the pattern support member 47, as shown in Figs. 3 and 7.

With the four scales 42, 43, 44 and 45 positioned within the pattern support 12 as shown in Fig. 2, the inner edges 93, 71, 91 and 92 respectively form a continuous light differentiating line of trace delineating a female quadrilateral template having perfectly square corners formed by the intersection of the scales. Although the rectangular female guiding contour formed by the inner edges of the scales is adequate for many types of contouring operations, it may be advantageous in some instances to utilize a template having rounded corners substituted for the square corners produced by the intersection of the scales themselves. For this purpose, there are provided a plurality of filler blocks of varying size and configuration adapted to cooperate with the scales to produce a female template of generally quadrilateral form but being provided with rounded corners of a required radius instead of square corners.

As shown in Fig. 2, four corner radius filler blocks 95, 96, 97 and 98 of like sizes, two short filler blocks 101, 102 and two long filler blocks 103, 104 are positioned on the transparent pattern support member 47, each of the blocks being maintained in endwise abutting engagement with two adjacent blocks by means of the scales 42, 43, 44 and 45. Within the filler blocks in endwise engagement, they cooperate to form a female template of rectangular shape and having rounded corners, the inner edges of the blocks delineating a continuous guiding contour 105. In addition to the filler blocks shown in Fig. 2, there are provided additional blocks (not shown) of graduated size and varying configuration that are removably positionable on the transparent pattern support member 47 in a similar manner. These additional blocks, together with those shown in the drawings, are arranged to cooperate with the scales 42, 43, 44 and 45 to provide a wide selection of symmetrical or unsymmetrical quadrilateral templates of varying size.

A principal advantage afforded by the cooperating scales and filler blocks is the convenience and speed with which a guiding contour of selected size can be arranged for controlling the reproduction of a corresponding contour in a workpiece. This is especially advantageous in facilitating the reproduction of small lots of workpieces. Usually, in copying machines of this type, individual templates must be manufactured or prepared whenever a workpiece of a different size or configuration is to be reproduced. This is an expensive process and extremely uneconomical in those cases in which only a few workpieces are to be reproduced. The cooperating scales and filler blocks on the other hand can be quickly and conveniently rearranged to constitute symmetrical or unsymmetrical templates and thus effect a considerable reduction in the expense of many copying operations.

Furthermore, the pattern support 12 and cooperating scales 42, 43, 44 and 45 facilitate the coordinate positioning of any template (not shown) including those of irregular configuration upon the transparent support 47 and a workpiece upon the work table 16 in any kind of a copying operation and irrespective of the configuration of the particular template required. Heretofore, the coordinated positioning of a pattern and workpiece has in most cases been a trial and error procedure in copying machines of this general type. The usual practise involved, first positioning a guiding template upon the transparent pattern support and then placing a workpiece in an approximate corresponding position on the work table. With an appropriate indicating device mounted in the tool spindle, the table was then traversed along the guiding contour by operating the copying control system to indicate the degree of misalignment of the workpiece relative to the pattern. It was necessary to repeat this entire procedure a number of times before the workpiece was properly positioned with respect to the guiding pattern. This process was especially disadvantageous in instances requiring the production of only one or a relatively small number of identical workpieces and resulted in a disproportionately long time for setting up the machine for performing a particular copying operation.

In the present invention however, this difficulty is obviated since the scales 42, 43, 44 and 45 are operative to determine the exact location of a template upon the transparent support member 47 and relative to the shutter head 24. As shown in Fig. 1, the work table 16 is provided on its respective edges with zero marks 106 corresponding to the position of the zero marks on the four racks 54, 55, 56 and 57 of the pattern support 12, Fig. 2. Thus, with the zero marks 106 providing a reference, a workpiece can be accurately positioned on the work table 16 in a position corresponding to the position of a pattern upon the transparent pattern support 47 and as determined by the cooperating scales 42, 43, 44 and 45.

From the foregoing description of the illustrative embodiments of the invention disclosed herein, it is apparent that there has been provided an improved pattern support in combination with an improved selectively adjustable template for a line tracker controlled copying machine. The pattern support is provided with a transparent pattern support member and a transparent chip guard carried in spaced apart parallelism in a manner that the latter affords complete protection to the pattern supporting area. A cooperating system of adjustably positionable scales and cooperating filler blocks are removably carried by the pattern support to constitute a selectively adjustable template for controlling feeding movements of the machine. The scales are likewise engageable with the pattern support for positioning any type pattern of selected configuration in any required position upon the transparent pattern support member.

Although an exemplifying embodiment of the invention has been described in considerable detail for the purpose of fully disclosing operative apparatus incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of the invention having now been fully explained in connection with the exemplifying apparatus herein set forth, I hereby claim as my invention:

1. In an adjustable template adapted to provide a line of trace for a light beam activated copying machine, a hollow quadrangular structure having four inner diametrically opposite sides provided with inwardly extending rack teeth and defining an enlarged central opening formed therein, a plurality of scales disposed to be removably engageable within said structure in a manner to constitute a selectively adjustable quadrangular template having its opposite sides spaced in parallelism and respectively delineated by one of said scales, each of said scales comprising a longitudinally extending scale member presenting rack teeth at one end, a scale extension slidably secured to the opposite end of each of said scale members and presenting outwardly extending rack teeth, means operatively associated with each of said scale members adapted to urge the respective scale extension associated therewith longitudinally outward, said scales being respectively engageable between a selected diametrically opposed pair of inner sides of said structure, and a template support member carried by said structure immediately below the said rack teeth in a position to bridge the opening formed therein and adapted to support said scales in any selected position of adjustment therewith.

2. In an adjustable template for a tracing machine, a template holder comprising a hollow quadrilateral structure having its opposite inner sides spaced in parallelism and provided with inwardly extending rack teeth, a support plate carried by said structure immediately below the said rack teeth formed therein, two pairs of longitudinally extensible scales disposed to cooperate with said structure for producing a female type quadrilateral template of predetermined size, said scales being provided at their opposite ends with rack teeth disposed to engage the said inwardly extending rack teeth provided within said hollow structure, one pair of said scales being removably positionable between the other two of the said opposite inner sides of said structure in intersecting relationship with the first pair of said scales, and a resilient mechanism operatively associated with each of the said scales respectively disposed to effect extensible movement of each of the said scales into meshing engagement with the said rack teeth extending inwardly from each of the said opposite inner sides of said structure.

3. In an adjustable template for a copying machine; four guiding racks positioned in quadrilateral relationship in the same plane and presenting inwardly extending rack teeth; each diametrically opposed pair of said racks being positioned in parallelism and perpendicular to the said racks adjacent thereto; a template support member carried immediately below said racks; and four scales selectively positionable upon said support member in a selected position of engagement with said racks; each of said scales comprising a scale support presenting rack teeth at one end, said support being provided with longitudinally extending vertical guideways disposed in parallelism, a resiliently biased cap presenting outwardly extending rack teeth slidably secured to the opposite end of said support for longitudinal movement, and a scale member presenting an inner guiding edge slidably secured to said support for longitudinal adjusting movement, said scale member being provided with complementary angular guideways disposed to slidably engage the said guideways formed on said support; two of said scales being engageable between two of the said racks in a manner that the said scale members associated therewith are positioned in spaced apart parallelism; the other two of said scales being positionable in a selected position of engagement between the other two of said racks in a manner that the said scale members associated therewith are in spaced apart parallelism and in perpendicular intersecting relationship to the other of said scale members whereby the said guiding edges of said scale members cooperate to delineate an infinitely adjustable quadrilateral template of selected size.

4. In an adjustable template adapted to provide a light differentiating line of trace for a light activated copying machine, a hollow quadrilateral structure having its opposite inner sides spaced in parallelism and provided with inwardly extending rack teeth, a transparent pattern support member carried by said structure immediately below the said rack teeth formed therein, a pair of scale supports removably positionable between the said rack teeth respectively formed on one pair of the said opposite inner sides of said structure, a second pair of scale supports removably positionable between the said rack teeth formed on the other pair of said opposite inner sides of said structure in intersecting relationship to said first pair of scale supports, each of said scale supports being provided at its opposite ends with rack teeth adapted to engage the said inwardly extending rack teeth respectively formed on each of the said opposite inner sides of said structure, each of said scale supports being provided with vertically formed angular guideways, a scale member slidably carried by each of said scale supports and being provided on its underside with a recess having complementary vertical guideways adapted to slidably engage the said guideways formed on the said support associated therewith, and resilient means operatively connected to retain the said guideways of each of the said scale members in slidably abutting engagement with the said guideways formed on the said scale support associated therewith, each of said scale members being longitudinally slidable along the said scale support respectively associated therewith for effecting a precisely regulated lateral adjustment of the said member relative to the said support whereby the said scale members are infinitely adjustable within the said structure in a manner that the said inner edges thereof cooperate to form a selectively adjustable female template delineating a continuous light differentiating line of trace whenever said scale supports are engaged within said structure in a selected position of intersecting quadrilateral relationship.

5. In an adjustable template for a line tracker controlled copying machine, a hollow quadrilateral frame provided with inner edges defining a central opening extending therethrough, a transparent pattern support member carried by said frame in a position to bridge one side of the hollow opening extending therethrough, two pairs of scale supports adjustably positionable between the said inner edges of said frame, one pair of said scale supports being positionable in spaced apart parallelism between two of the said opposed inner edges of said frame, another pair of said scale supports being positionable in spaced apart parallelism between the other two of the said opposed inner edges of said frame in perpendicular intersecting relationship with the first pair of said supports, a resiliently biased member movable secured to each of said supports and operative to releasably secure the said support associated therewith into a selected position of transverse adjustment between an opposed pair of the said inner edges of said frame, each of said scale supports being provided with vertically formed angularly inclined guideways, four scale members respectively provided with a straight guiding inner surface and an angularly inclined guideway complementary to the said guideways formed on said supports, each one of said scale members being slidably secured to a respective one of said scale supports with the said guideways in slidable abutting engagement, and separate resilient means operatively connected to retain the said guideways of an associated one of said supports and said scale members in slidable abutting engagements, each of said scale members being longitudinally slidable along the said support associated therewith for effecting an infinite lateral adjustment thereof, each of said scale members being retained in perpendicular intersecting relationship to the said scale members adjacent thereto whenever said scale supports are positioned in quadrilateral relationship within said frame whereby the said inner edges of said scale members cooperate to constitute an infinitely adjustable quadrilateral template of selected size.

6. In a pattern support for a copying machine, a transparent pattern support member, a hollow quadrilateral frame defining a central opening and arranged to carry said transparent pattern support member in a position to bridge the said opening formed therein, said frame being provided on its inner edges with rack teeth, four longitudinally extensible scale supports having complementary rack teeth formed at their opposite ends disposed to be removably positionable within said frame, one pair of said scale supports being engageable between two of the opposed inner edges of said frame in spaced apart parallelism, the other pair of said scale supports being engageable between the other of the said opposed inner edges of said frame in spaced apart parallelism and in perpendicular intersecting relationship to the first pair of said scale supports, each of said scale supports being provided with vertical angularly inclined guideways, a scale member provided with a complementary angularly inclined guidway and an inner straight guiding edge slidably secured to each of said scale supports, means operatively arranged to retain the said angular guideway of one of said scale members in slidable abutting engagement with the said angularly inclined guideways of the said support respectively associated therewith, each of said scale members being longitudinally slidable to effect an infinite lateral adjustment of the said inner guiding edge formed thereon relative to the said scale support respectively associated therewith whereby the said scale members and the said supports respectively associated therewith are removably positioned within said frame in such a manner that the said inner guiding edges respectively formed on said scale members cooperate to constitute a quadrilateral template of infinitely adjusted size.

7. In a pattern support for a copying machine comprising a generally U-shaped frame provided on its inner three edges with a continuous groove, a quadrilateral transparent pattern support member slidably and removably positionable within the said groove formed in said frame, said transparent member being adapted to support a pattern providing a light differentiating line of trace, a locking member removably secured to the outer ends of the opposite arms of said U-shaped frame to retain the said transparent pattern support member within the said groove formed therein, resilient means positioned within a portion of the said groove adapted to resiliently engage two of the adjacent side edges of the transparent pattern support member, a plurality of adjustable bearing means movably carried within another portion of said groove to engage another side edge of the said transparent pattern support member in opposition to said resilient means, an adjustable bearing member movably carried by said locking member adapted to engage another side edge of said transparent pattern support member in opposition to said resilient means, said bearing means and said bearing member being adjustable to effect a selective angular and lateral adjustment of said transparent support member within said groove and relative to said frame, and an adjusting screw operatively associated with each of said bearing means and said bearing member adapted to retain the said means and said member in a selected position of adjustment relative to said frame.

8. In an adjustable pattern support for a copying machine, a hollow frame formed in the shape of a quadrilateral structure defining an enlarged central opening provided with rack teeth extending inwardly from the opposed inner sides thereof, a plurality of longitudinally extensible scales removably positionable within the said hollow structure to constitute a female template of selected size, said scales being provided at their opposite ends with rack teeth complementary to the rack teeth formed on the inner sides of said structure, two of said scales being positionable between two of the opposed inner sides of said structure, two other of the scales being positionable between the other two of the opposed inner sides of said structure in perpendicular intersecting relationship to the first two of said scales, a transparent pattern support member carried by said frame below the rack teeth for supporting said scales in a selectively adjusted position of engagement with said structure, and a plurality of filler blocks removably positionable upon said transparent pattern support member, said filler blocks being positionable in endwise abutting engagement and being so formed that the outer edges thereof coact to form a quadrilateral figure and the inner edges thereof coact to constitute a female template of selected configuration, said filler block being retained in endwise abutting engagement by said scales whereby said scales and said filler blocks are selectively adjustable within said structure to constitute different female templates of selected configuration.

9. In a pattern support comprising a generally U-shaped frame provided on its inner three edges with a continuous groove, a quadrilateral transparent pattern support member slidably and removably positionable within the groove formed in said frame, said transparent member being adapted to support a pattern providing a light differentiating line of trace, a locking member removably secured to the outer ends of the opposite arms of said U-shaped frame to retain said support member within the groove formed therein, resilient means carried within a portion of the groove formed in said frame adapted to resiliently engage two of the adjacent side edges of said support member, a plurality of bearing means movably carried within another portion of the groove formed in said frame to engage another side edge of said support member in opposition to said resilient means, a movable bearing carried by said locking member adapted to engage another side edge of said support in opposition to said resilient means, said bearing means and said bearing being adjustable to effect a selective angular and lateral adjustment of said transparent member within said groove and relative to said frame, four racks respectively presenting inwardly extending rack teeth carried by said frame in quadrilateral spaced relationship above said transparent member, four scale assemblies selectively positionable between said racks in intersecting quadrilateral spaced relationship to constitute a female template of selected size, each of said scale assemblies comprising a scale member presenting outwardly extending rack teeth at one end, a scale extension presenting outwardly extending rack teeth slidably secured to the opposite end of said scale member for limited longitudinal movement, resilient means connected to urge each of said scale extensions longitudinally outward relative to the said scale members associated therewith, and a guide member presenting an inner guiding edge slidably carried by each of said scale members for limited lateral adjustment relative thereto.

10. In an adjustable pattern support for a copying machine, a hollow frame having inner sides defining a quadrilateral opening having its opposite edges disposed in parallelism, a plurality of longitudinally extensible scales removably positionable within said frame to constitute a female template of selected size, two of said scales being positionable between two of the opposed inner sides of said frame, two other of said scales being positionable between two other of the inner sides of said frame in perpendicular intersecting relationship to the first two of said scales, a pattern support member carried in position to support said scales in a selected position of engagement within said frame, and a plurality of filler blocks removably positionable upon said pattern support member, said filler blocks being positionable in abutting engagement and being so formed that the outer edges thereof coact to form a quadrilateral figure and the inner edges thereof coact to constitute a female template of selected configuration, said filler blocks being retained in abutting engagement by said scales whereby said scales and said filler blocks are selectively adjustable within said frame to constitute different female templates of selected configuration.

11. In a pattern support comprising a generally U-shaped frame provided on its inner three edges with a continuous groove, a transparent pattern support member slidably and movably positionable within the groove formed in said frame, said transparent member being adapted to support a pattern providing a light differentiating line of trace, a locking member removably secured to the outer ends of the opposite arms of said U-shaped frame to retain said support member within the groove formed therein, resilient means carried within a portion of the groove formed in said frame adapted to resiliently engage two of the adjacent side edges of said transparent support member, a plurality of bearings movably carried within another portion of the groove formed in said frame to engage another side of said support member in opposition to said resilient means, and another bearing movably carried by said locking member adapted to engage another side edge of said transparent support member in opposition to said resilient means, said bearings being predeterminately adjustable to effect a selective angular and lateral adjustment of said transparent support member within said groove and relative to said frame.

References Cited in the file of this patent
UNITED STATES PATENTS

| | | |
|---|---|---|
| 105,216 | Jenkins | July 12, 1870 |
| 464,070 | Heffelfinger | Dec. 1, 1891 |
| 625,005 | Wilkinson | May 16, 1899 |
| 1,277,318 | Johnson | Aug. 27, 1918 |
| 1,679,074 | Carter | July 31, 1928 |
| 1,851,004 | Donaldson | Mar. 29, 1932 |
| 1,971,297 | Donaldson | Aug. 21, 1934 |
| 2,065,253 | Trotter | Dec. 22, 1936 |
| 2,095,865 | Gorton | Oct. 12, 1937 |
| 2,190,360 | Howard | Feb. 13, 1940 |
| 2,306,009 | Bradshaw | Dec. 22, 1942 |
| 2,331,337 | Meyer | Oct. 12, 1943 |
| 2,386,816 | Scholz | Oct. 16, 1945 |
| 2,410,550 | Padva | Nov. 5, 1946 |
| 2,430,924 | Fowle et al. | Nov. 18, 1947 |
| 2,494,077 | Wilkinson | Jan. 10, 1950 |